(12) United States Patent
Shin (10) Patent No.: US 12,477,198 B2
(45) Date of Patent: Nov. 18, 2025

(54) CLOSED LOOP PHOTOGRAPHY

(71) Applicant: GOOGLE LLC, Mountain View, CA (US)

(72) Inventor: Dongeek Shin, Santa Clara, CA (US)

(73) Assignee: GOOGLE LLC, Mountain View, CA (US)

(*) Notice: Subject to any disclaimer, the term of this patent is extended or adjusted under 35 U.S.C. 154(b) by 222 days.

(21) Appl. No.: 18/334,585

(22) Filed: Jun. 14, 2023

(65) Prior Publication Data

US 2023/0403449 A1 Dec. 14, 2023

Related U.S. Application Data

(60) Provisional application No. 63/366,375, filed on Jun. 14, 2022.

(51) Int. Cl.
| | |
|---|---|
| *H04N 23/52* | (2023.01) |
| *G02B 27/01* | (2006.01) |
| *G03B 9/58* | (2021.01) |
| *G06T 7/00* | (2017.01) |
| *H04N 23/60* | (2023.01) |
| *H04N 23/61* | (2023.01) |
| *H04N 23/68* | (2023.01) |
| *H04N 23/71* | (2023.01) |

(52) U.S. Cl.
CPC ......... *H04N 23/52* (2023.01); *G02B 27/0172* (2013.01); *G03B 9/58* (2013.01); *G06T 7/0016* (2013.01); *H04N 23/61* (2023.01); *H04N 23/665* (2023.01); *H04N 23/6812* (2023.01); *H04N 23/71* (2023.01); *G02B 2027/0196* (2013.01); *G06T 2207/20081* (2013.01)

(58) Field of Classification Search
CPC ...... H04N 23/52; H04N 23/61; H04N 23/665; H04N 23/6812; H04N 23/71; H04N 23/617; H04N 23/80; G02B 27/0172; G02B 2027/0196; G06T 7/0016; G06T 2207/20081; G03B 9/58
See application file for complete search history.

(56) References Cited

U.S. PATENT DOCUMENTS

| | | | | |
|---|---|---|---|---|
| 1,007,354 | A | 10/1911 | Hersh | |
| 4,866,470 | A * | 9/1989 | Arai | G03B 17/02 396/281 |
| 5,210,560 | A * | 5/1993 | Labaziewicz | G03B 17/18 396/296 |
| 5,815,750 | A * | 9/1998 | Ishiguro | G03B 17/02 396/266 |
| 5,943,516 | A * | 8/1999 | Uchiyama | G03B 17/18 396/281 |
| 9,055,210 | B2 * | 6/2015 | Bos | H04N 23/64 |
| 2007/0146536 | A1 * | 6/2007 | Lemoine | G03B 13/02 348/E5.042 |
| 2015/0163400 | A1 * | 6/2015 | Geiss | G06V 10/147 348/231.99 |

(Continued)

*Primary Examiner* — Twyler L Haskins
*Assistant Examiner* — John H Morehead, III
(74) *Attorney, Agent, or Firm* — Brake Hughes Bellermann LLP (57) ABSTRACT

Improved techniques of generating photographs using a camera or other image capture device includes the use of "soft" indicators such as haptics, audio, heads-up display, and other modalities to warn the user of a potential occlusion before a user activates a shutter trigger.

23 Claims, 9 Drawing Sheets

(56) References Cited

U.S. PATENT DOCUMENTS

2017/0180637 A1* 6/2017 Lautenbach ........... H04N 23/63
2018/0341329 A1 11/2018 San Agustin Lopez
2020/0034959 A1* 1/2020 Lakshmanan .......... H04N 23/84
2021/0090299 A1 3/2021 Cardei et al.
2021/0406532 A1* 12/2021 Qu ......................... G06V 20/10

* cited by examiner

CLOSED LOOP PHOTOGRAPHY

CROSS REFERENCE TO RELATED APPLICATION

This application claims the benefit of U.S. Provisional Application No. 63/366,375, filed Jun. 14, 2022, the disclosure of which is enclosed herewith by reference in its entirety.

TECHNICAL FIELD

This description relates in general to image capture and determining whether a scene in an image to be captured is being occluded by an object.

BACKGROUND

Some cameras are used by people to take photographs of scenes. To effect the taking of a photograph, a person looks at a scene through a viewfinder, electronic or otherwise, and depresses a button which triggers the opening of a shutter for a set amount of time based on desired exposure level, focus setting, and other factors related to the camera itself.

SUMMARY

In some cameras, occlusion of an image of a scene by a finger that depresses a shutter trigger is a common occurrence. Moreover, some form factors such as smartglasses devices do not permit previewing an image before capture. In such form factors, it is important to find a way to warn a user when the finger is about to occlude an image. In this description, an occlusion detection device is presented that (i) detects a moving finger, (ii) determines whether the finger is about to depress the shutter trigger, (iii) if such a determination is made, determines whether the finger will occlude the image about to be captured, and (iv) if such a determination is made, issue an alert to the user. The detection of the moving finger may be made by a motion detector that reflects electromagnetic radiation off the finger. The occlusion detection device then inputs the reflected radiation into a support vector machine (SVM); the SVM outputs an indicator of whether the finger is about to touch the shutter trigger. If the indicator indicates that the finger is about to touch the shutter trigger, the occlusion detection device then causes the camera to take 2-4 images of the finger and input those images into a convolutional neural network (CNN). The CNN then outputs an occlusion score based on the input images of the finger, which if greater than a threshold causes the occlusion detection device to issue an alert to the user before the image is captured. In this way, finger-occluded images of scenes are avoided.

In one general aspect, an apparatus may include an image capture device configured to capture images of a scene. The image capture device may include a light detector and a shutter trigger configured to cause a shutter to open to allow light reflected from the scene toward the image capture device to be incident on the light detector. The apparatus may also include an occlusion detection device configured to determine whether an object will occlude the scene while the shutter is open. The occlusion detection device may include a proximity detection device configured to determine whether the object is moving toward the shutter trigger; and a notification device configured to, in response to the proximity detection device determining that the object is moving toward the shutter trigger, transmit a notification that the object is occluding the scene.

In another general aspect, a method may include receiving electromagnetic radiation reflected by an object. The method may also include determining whether the object is occluding a scene based on the received electromagnetic radiation reflected by the object. The method may further include, in response to the proximity detection device determining that the object is occluding the scene, transmit a notification that the object is occluding the scene.

In another general aspect, a computer program product may comprise a non-transitory storage medium. The computer program product may include code that, when executed by processing circuitry, causes the processing circuitry to perform a method. The method may include receiving electromagnetic radiation reflected by an object. The method may also include determining whether the object is occluding a scene based on the received electromagnetic radiation reflected by the object. The method may further include, in response to the proximity detection device determining that the object is occluding the scene, transmit a notification that the object is occluding the scene.

The details of one or more implementations are set forth in the accompanying drawings and the description below. Other features will be apparent from the description and drawings, and from the claims.

BRIEF DESCRIPTION OF THE DRAWINGS

FIG. 1B is a front view, FIG. 1C is a rear view.

DETAILED DESCRIPTION

This disclosure relates to addressing a technical problem of occlusion of a scene to be captured with a camera (or other image capture device) by a finger used to press a shutter trigger of the camera. It is commonplace to have videos or photos affected by an unwanted occlusion by the finger used to press the shutter trigger. While this problem exists in any camera form factor (e.g., single-lens reflex, cell phone, tablet, watch), the problem is especially acute when the camera is mounted on a smartglasses frame or other head mounted wearable devices (e.g., goggles, a headset, etc.) because there is no way to tell that such an occlusion took place until after the picture has been taken.

A conventional solution to the above-described technical problem involves disposing the shutter trigger on a portion of the smartglasses frame opposite to the portion on which the camera is disposed. In this way, there is far less chance that the finger (or generally, an object) used to depress or activate the shutter trigger may occlude the scene as viewed by the camera. This conventional solution, however, is not as desirable as a first impression would suggest. For example, the camera-trigger frame coexistence sets a proper expectation of the camera field-of-view to the user.

A better way to mitigate occlusion due to finger placement near the shutter trigger is to indicate to the user about a potential occlusion before the user activates the shutter trigger (e.g., depresses a button that opens and closes the shutter of the camera). Accordingly, a technical solution to the above-described technical problem includes the use of "soft" indicators such as haptics, audio, heads-up display, and other modalities to warn the user of a potential occlusion before the user activates the shutter trigger.

A technical advantage of this technical solution is that the user may be guided by a soft indicator to position their finger (or object used to activate the shutter trigger) in such a way as to avoid occluding the scene and accordingly produce a higher-quality photograph. In addition, this technical solution avoids any parallax effect from seeing different perspectives of the scene.

The above-described technical solution is denoted "closed-loop photography," and involves hardware and software that is not normally included in image capture devices. Elements of the closed-loop photography solution an occlusion detection device configured to determine whether an object (e.g., finger) will occlude the scene while the shutter is open. The occlusion detection device includes a proximity detection device configured to determine whether the object is moving toward the shutter trigger, and a notification device configured to, in response to the proximity detection device determining that the object is moving toward the shutter trigger, transmit a notification that the object is occluding the scene.

Figure 1A:
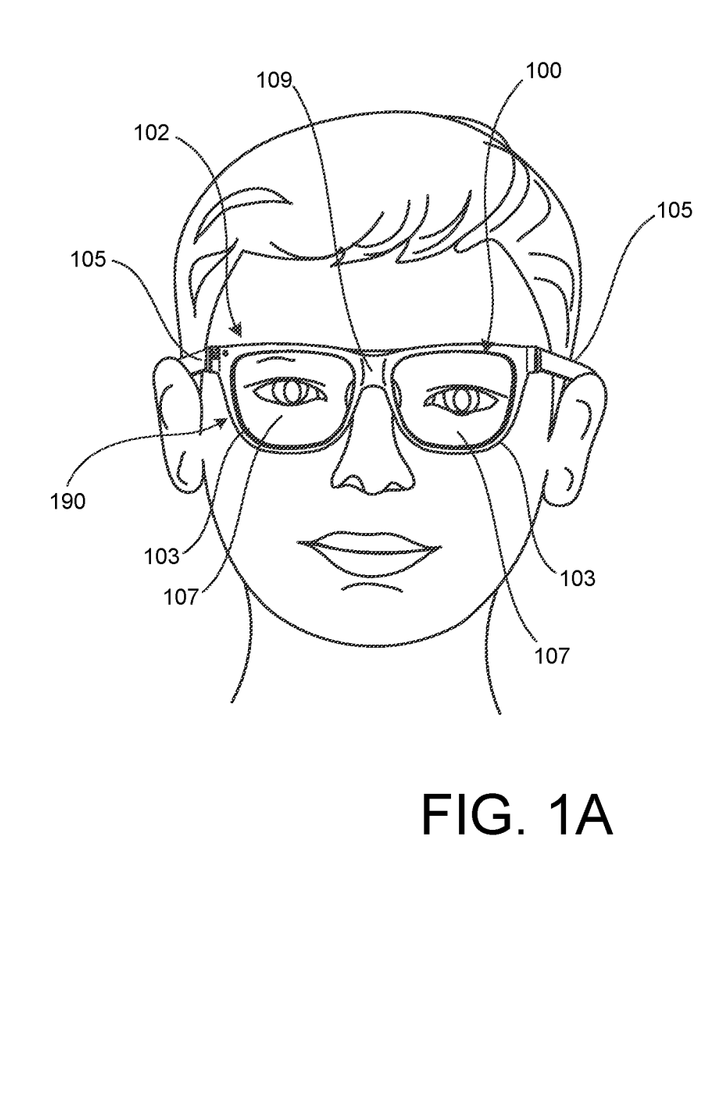
FIG. 1A is a diagram that illustrates an example system, in accordance with implementations described herein.
Figure 1B:
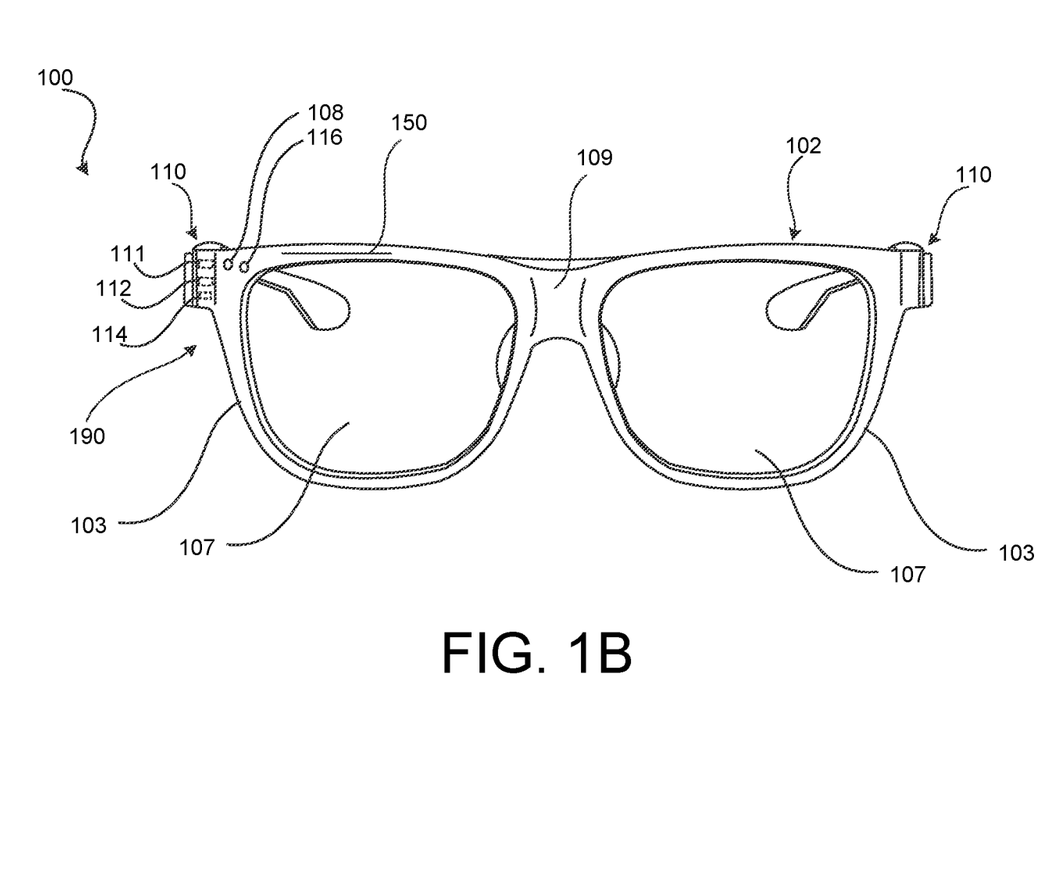
Figure 1C:
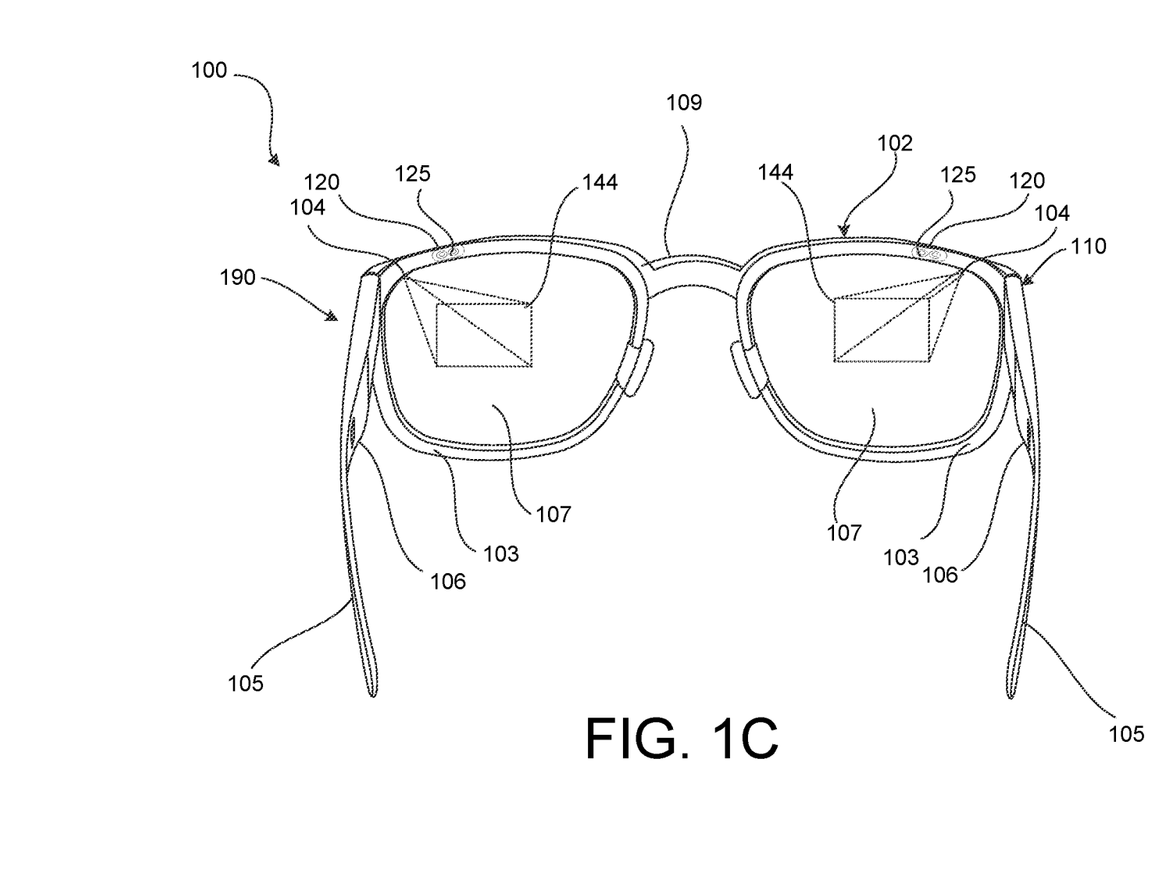
Figure 1D:
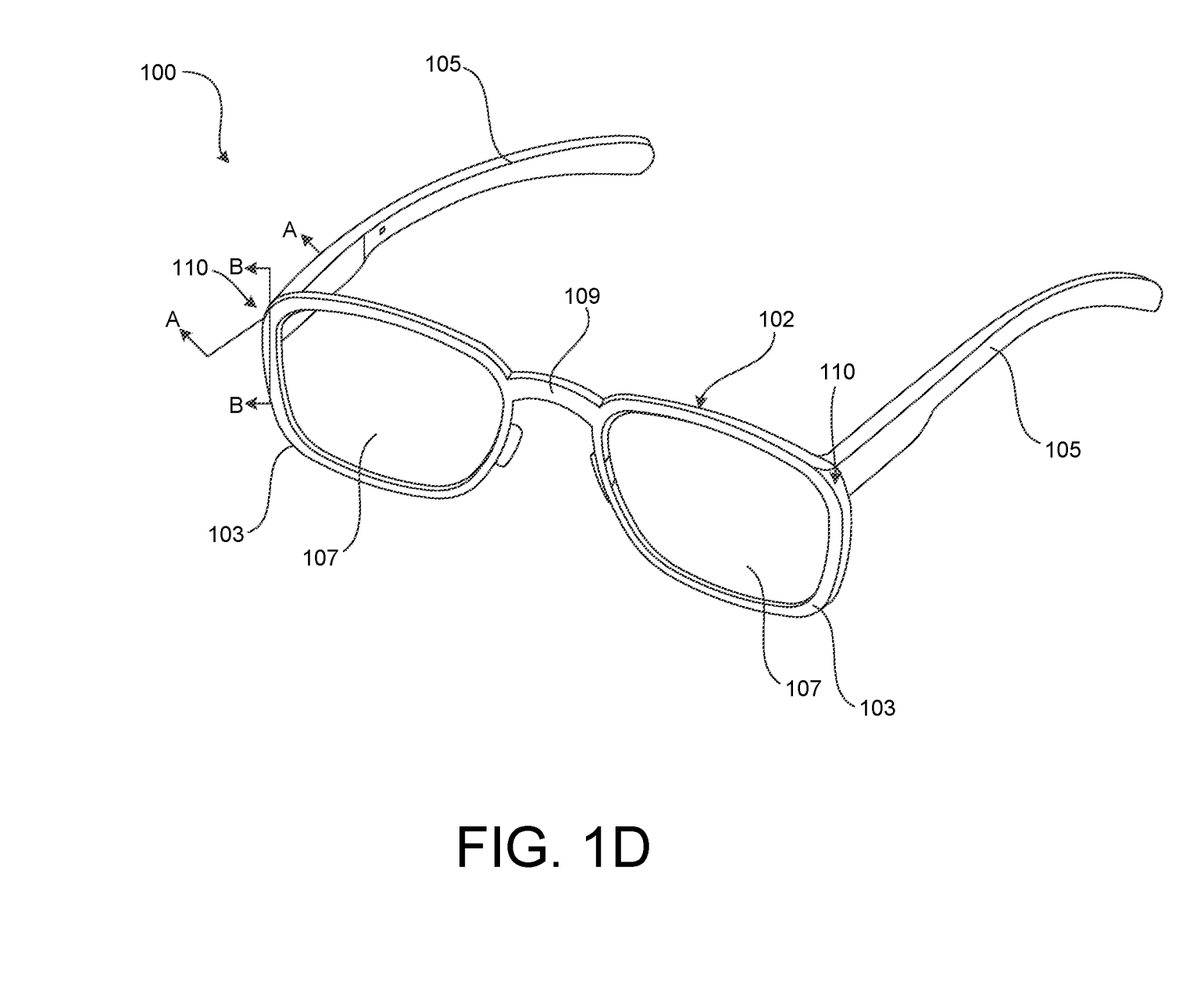
FIG. 1D is a perspective view, of the example head mounted wearable device shown in FIG. 1A, in accordance with implementations described herein.

FIG. 1A illustrates a user wearing an example head mounted wearable device 100. In this example, the example head mounted wearable device 100 is in the form of example smartglasses including display capability and computing/processing capability, for purposes of discussion and illustration. The principles to be described herein may be applied to other types of eyewear, both with and without display capability and/or computing/processing capability. FIG. 1B is a front view, FIG. 1C is a rear view, and FIG. 1D is a perspective view, of the example head mounted wearable device 100 shown in FIG. 1A. As noted above, in some examples, the example head mounted wearable device 100 may take the form of a pair of smartglasses, or augmented reality glasses.

As shown in FIGS. 1B-1D, the example head mounted wearable device 100 includes a frame 102. The frame 102 includes a front frame portion defined by rim portions 103 surrounding respective optical portions in the form of lenses 107, with a bridge portion 109 connecting the rim portions 103. Arm portions 105 are coupled, for example, pivotably or rotatably coupled, to the front frame by hinge portions 110 at the respective rim portion 103. In some examples, the lenses 107 may be corrective/prescription lenses. In some examples, the lenses 107 may be an optical material including glass and/or plastic portions that do not necessarily incorporate corrective/prescription parameters.

A display device 104 may be coupled in a portion of the frame 102. In the example shown in FIGS. 1B and 1C, the display device 104 is coupled in the arm portion 105 of the frame 102. With the display device 104 coupled in the arm portion 105, an eye box 140 extends toward the lens(es) 107, for output of content at an output coupler 144 at which content output by the display device 104 may be visible to the user. In some examples, the output coupler 144 may be substantially coincident with the lens(es) 107. In some examples, the head mounted wearable device 100 can also include an audio output device 106 (such as, for example, one or more speakers), an illumination device 108, a sensing system 111, a control system 112, at least one processor 114, and an image capture device 116, or camera 116. The camera (or image capture device) 116 may capture images via a shutter trigger, or button; the shutter trigger is configured to cause a shutter to open to allow light reflected or scattered from a scene toward the image capture device 116 to be incident on a light detector (e.g., a charged-coupled device (CCD) array, a photomultiplier, silver halide photographic film, and the like).

In some examples, the display device 104 may include a see-through near-eye display. For example, the display device 104 may be configured to project light from a display source onto a portion of teleprompter glass functioning as a beamsplitter seated at an angle (e.g., 30-45 degrees). The beamsplitter may allow for reflection and transmission values that allow the light from the display source to be partially reflected while the remaining light is transmitted through. Such an optic design may allow a user to see both physical items in the world, for example, through the lenses 107, next to content (for example, digital images, user interface elements, virtual content, and the like) generated by the display device 104. In some implementations, waveguide optics may be used to depict content on the display device 104.

In some examples, the head mounted wearable device 100 may include a gaze tracking device 120 including, for example, one or more sensors 125, to detect and track eye gaze direction and movement. Data captured by the sensor(s) 125 may be processed to detect and track gaze direction and movement as a user input. In some examples, the sensing system 111 may include various sensing devices and the control system 112 may include various control system devices including, for example, one or more processors 114 operably coupled to the components of the control system 112. In some examples, the control system 112 may include a communication module providing for communication and exchange of information between the head-mounted wearable device 100 and other external devices.

In some implementations, the camera 116 has a shutter button in its vicinity, e.g., next to the camera 116. In such implementations, the one or more processors 114 are configured to determine whether (i) a finger moving near the shutter button is about to press the shutter button (or, alternatively, touch another portion of the frame 102) and (ii) if the one or more processors 114 determines that the finger is about the press the shutter button, whether the finger is going to obscure the resulting image. In order to determine whether a finger moving near the shutter button is about to press the shutter button, there needs to be some motion detection capability to detect the motion of the finger. This is illustrated in FIGS. 2 and 3.

Figure 2:
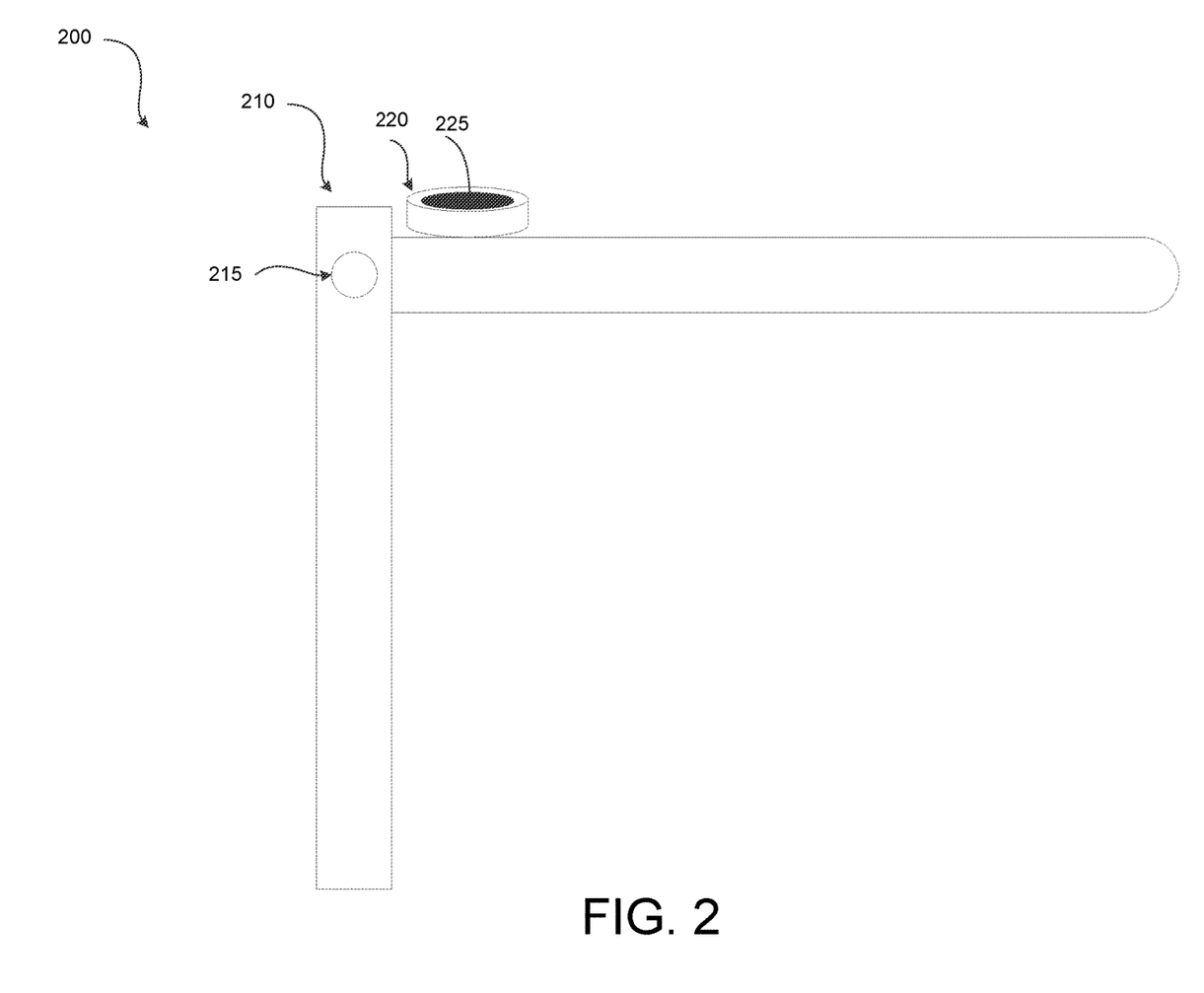
FIG. 2 is a diagram that illustrates a side view of a camera mounted on a smartglasses frame such that the camera has a shutter trigger with an IR proximity sensor embedded in the shutter trigger.

FIG. 2 illustrates a side view 200 of a camera 215 mounted on a smartglasses frame 210 such that the camera 215 has a shutter trigger 220 with a proximity detection device 225 that includes an infrared (IR) proximity sensor. As shown in FIG. 2, the proximity detection device 225 is embedded in the shutter trigger 220, which takes the form of a mechanical button. As an example, the IR proximity sensor may operate in a wavelength band centered at 850 nm. In some implementations, the IR proximity sensor includes a light-emitting diode (LED)-photodiode (PD) pair.

The arrangement of the proximity detection device 225 and the shutter trigger 220 shown in FIG. 2, while better for standby detection capability, is only an example illustrating the principal of usage and is not meant to be limiting. For example, in some implementations, the IR proximity sensor may be placed in a vicinity of the shutter trigger as shown in FIG. 3.

Figure 3:
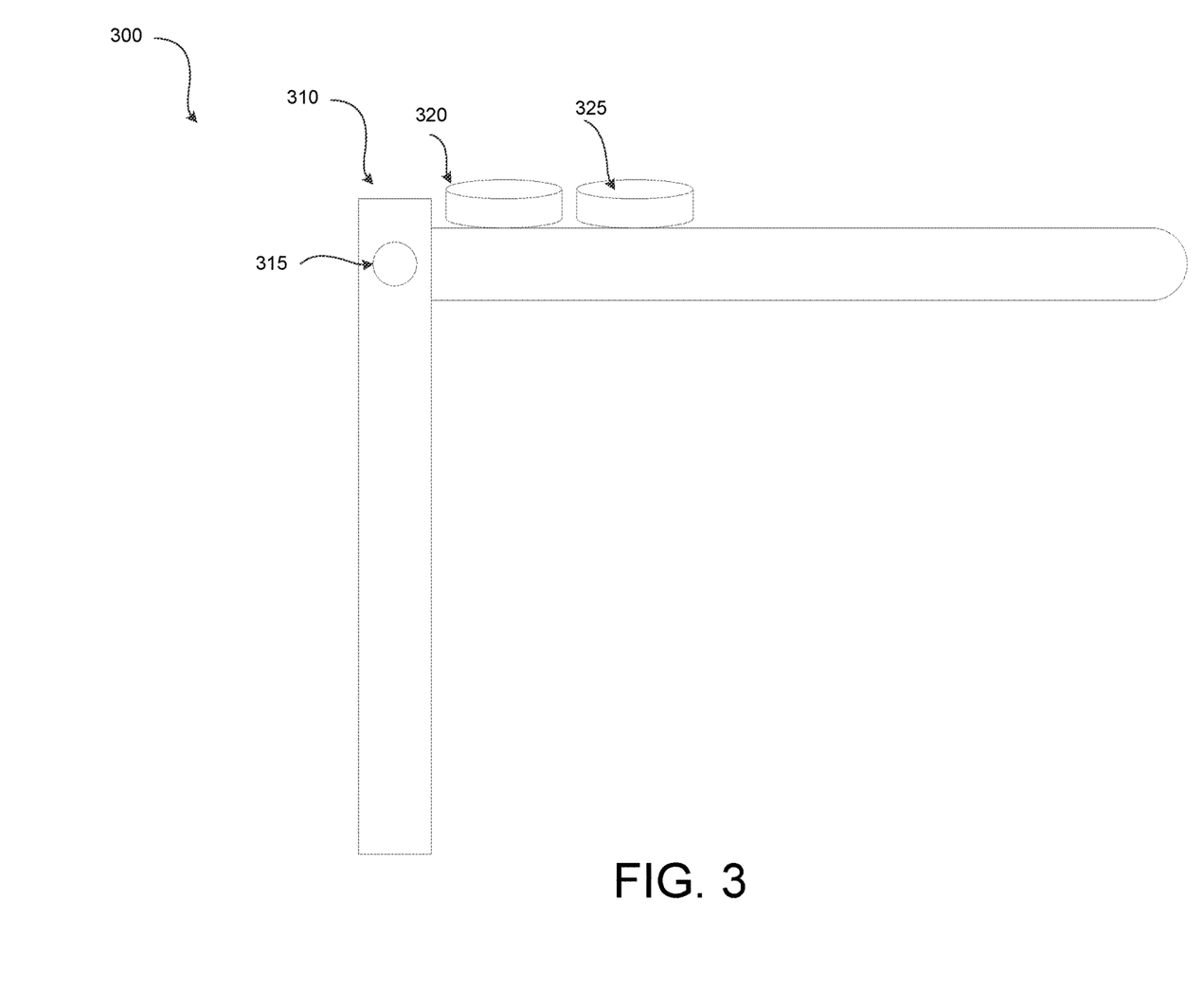
FIG. 3 is a diagram that illustrates a side view of a camera mounted on a smartglasses frame such that the camera has a shutter trigger with an IR proximity sensor next to the shutter trigger.

FIG. 3 illustrates a side view 300 of a camera 315 mounted on a smartglasses frame 310 such that the camera 315 is adjacent to a shutter trigger 320 with a proximity detection device 325. In the case illustrated in FIG. 3, the proximity detection device 325 may include an IR proximity sensor. In some implementations, the IR proximity sensor may use wavelength bands other than infrared, e.g., millimeter wave (mmWave) or an optical band.

The IR proximity sensor is configured to detect a "ready to capture" moment just as the potentially occluding object (e.g., finger, pointer) is about to engage the shutter trigger. Nevertheless, it may not be absolutely clear to the IR proximity sensor that an object in proximity to the shutter trigger is necessarily going to engage the shutter trigger (e.g., 220, 320). For example, when a camera (e.g., 215, 315) is disposed on a smartglasses frame, the IR proximity sensor may or may not have a capability to distinguish between a movement to engage the shutter trigger from that, for example, to scratch an itch on the user's face in a vicinity of the smartglasses frame.

Accordingly, the proximity detection device (e.g., 225, 325) may also include processing circuitry configured to determine whether the object is moving to cause the shutter to be opened based on a temporal pattern of the electromagnetic radiation reflected from the object. For example, the IR proximity sensor transmits IR radiation that propagates away from the camera (e.g., 215, 315) and receives the IR electromagnetic radiation that is reflected by the object in the vicinity of the shutter trigger (e.g., 220, 320). The reflected radiation is processed as a reflected signal with a time-varying amplitude (e.g., brightness, intensity, irradiance) because the object is moving near the shutter trigger. Accordingly, the proximity detection device is configured to determine whether the object is about to engage the shutter trigger based on a temporal pattern (e.g., signature) of the amplitude.

Figure 4:
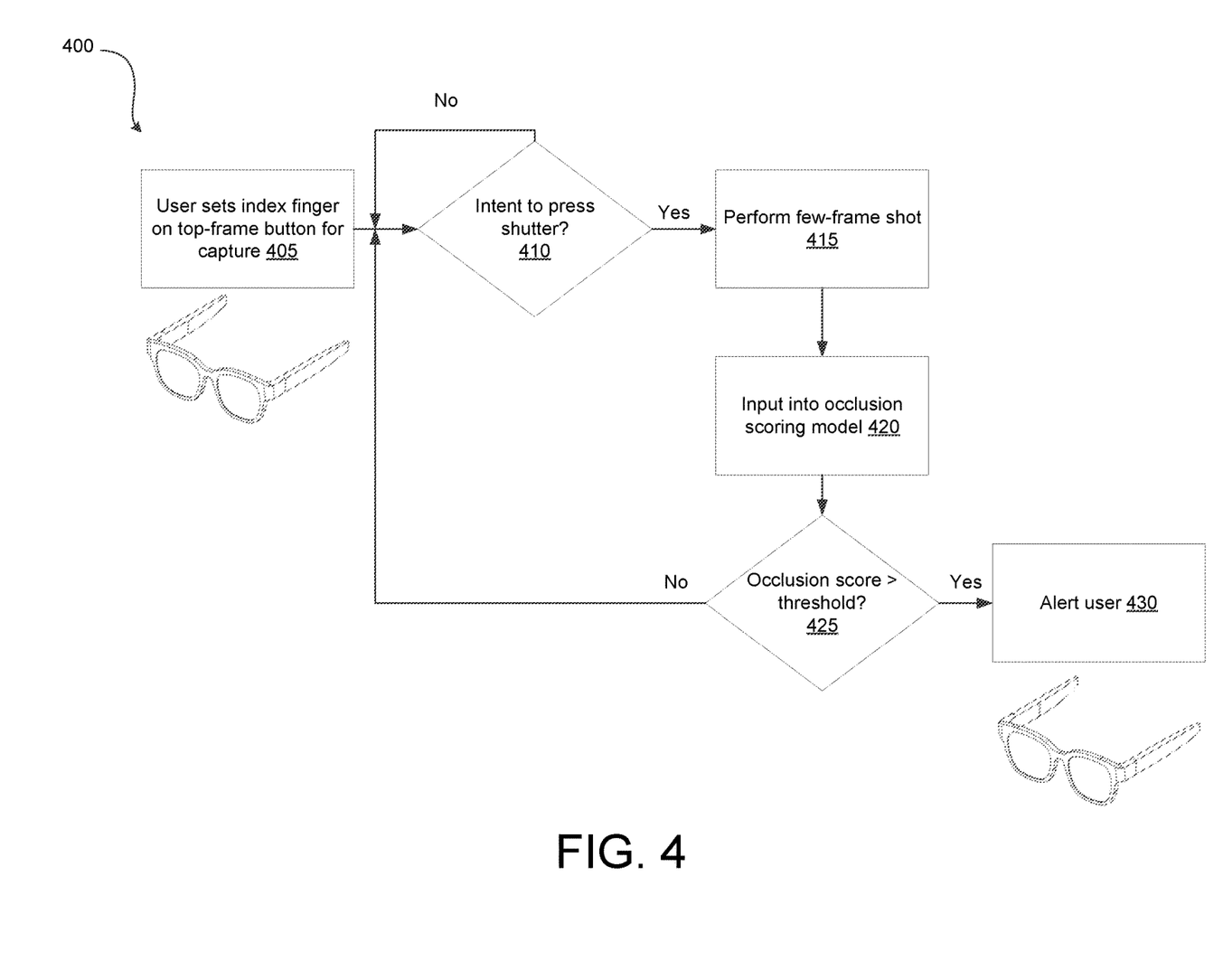
FIG. 4 is a flow chart that illustrates a process flow for occlusion detection.

FIG. 4 illustrates a general process flow for occlusion detection that involves a proximity detection device as described with respect to FIGS. 2 and 3. As shown in FIG. 4, at 405 the user moves their index finger toward the shutter button for possible image capture. At 410 the proximity detection device uses processing circuitry configured to run an optical touch classifier that determines whether an object is about to engage the shutter trigger based on the temporal pattern of amplitude of a signal (i.e., IR radiation) reflected from the object. That is, the processing circuitry maps the temporal pattern of amplitude of the reflected signal to a binary value: whether or not the object is about to engage the shutter trigger.

As shown in FIG. 4, the optical touch classifier mapping between the temporal pattern of amplitude of the reflected signal to the determination of whether or not the object is about to engage the shutter trigger may be defined by a machine learning algorithm. Nevertheless, because the optical touch classifier may be of minimal complexity for a real-time determination, in some implementations the optical touch classifier includes a linear support vector machine (SVM).

In some implementations, and as shown in FIG. 4, at 410 the optical touch classifier uses a (proximity, signal amplitude) ordered pair measured by the IR proximity sensor. In some implementations, during a standby mode the proximity coordinate may be represented by relatively large values when e.g., a finger is directly occluding within a distance of less than 1 cm from the shutter trigger); the received reflected amplitude may also be high as reflected signal amplitude falls off in squared fashion over distance and the object is near to the IR proximity sensor.

The optical touch classifier as shown in FIG. 4 uses a simple linear SVM trained to classify the valid standby data points (i.e., high proximity, high amplitude) from other false-positive sources. To accomplish this, the linear SVM outputs a classification score as follows.

$$\text{classification score} = \alpha_1 * \text{proximity} + \alpha_2 * \text{amplitude} + \alpha_3.$$

The coefficients $\alpha_1$, $\alpha_2$, and $\alpha_3$ may be trained offline using optical touch data. For example, these coefficients may be determined through an offline training to take values $\alpha_1=0.8$, $\alpha_2=3$, and $\alpha_3=2$. The object may be classified as being about to engage the shutter trigger if the classification score is sufficiently large (i.e, larger than a threshold score).

If the classification score indicates that the object is not about to engage the shutter trigger at a moment in time, then the optical touch classifier takes no further action other than continuing classification of reflected signals. In contrast, if the classification score is sufficiently large, e.g., greater than a threshold score, then the occlusion detection device begins the standby mode to determine whether the object is occluding the scene sufficiently to warrant a notification.

As shown in FIG. 4, the standby mode includes three stages: 1) taking few-frame shots at 415, 2) inputting the few-frame shots into an occlusion scoring model at 420 to produce an occlusion score, and 3) modulating a playback of a notification at 430 if the occlusion score is sufficiently large at 425. These stages may be performed by additional processing circuitry located in the camera (image capture device) or within a network connected to the camera.

The few-frame shots at 415 are a small number of sequential frames that are caused to be taken by the additional processing circuitry. In some implementations, the number of frames taken may be four or five, spaced apart in time by, e.g., 2-4 microseconds or a rate of 1-2 frames per microsecond. A benefit of using the small number of sequential frames rather than a single frame is that the sequential frames provide a more consistent occlusion score that has less chance of false positives. Accordingly, an optical flow measure may be computed as a measure of the consistency of the occlusion.

If the optical flow measure indicates sufficient consistency of occlusion, then the frames may be input into the occlusion scoring model at 420. In some implementations, the optical flow measure is also input into the occlusion scoring model. In some implementations, the occlusion scoring model includes a convolutional neural network (CNN) that takes the frames and/or optical flow measure and outputs an occlusion score. In some implementations, the CNN has between three and five hidden layers, with each layer having, e.g., 100×100 coefficients. In some implementations, the occlusion strength (e.g., score) is a number between zero and one; in such an implementation, output nodes of the CNN may have softmax layers that restrict the score to values between zero (no occlusion) and one (totally occluded). In some implementations, the CNN is trained offline with a calibrated and controlled training dataset that includes of images with an object (e.g., finger, hand) occluding the field-of-view of the camera.

In the final stage, at 430 the additional processing circuitry generates a notification over a specified modality (e.g., audio, heads-up display, tactile) when the occlusion score is sufficiently large (e.g., greater than a threshold) at 425. In some implementations, the occlusion score serves as an indicator of the notification intensity (e.g., audio volume, display brightness or color, vibration amplitude). The notifications may continue until the object no longer occludes the scene, or has a sufficiently small occlusion score (e.g., less than a threshold.)

Figure 5:
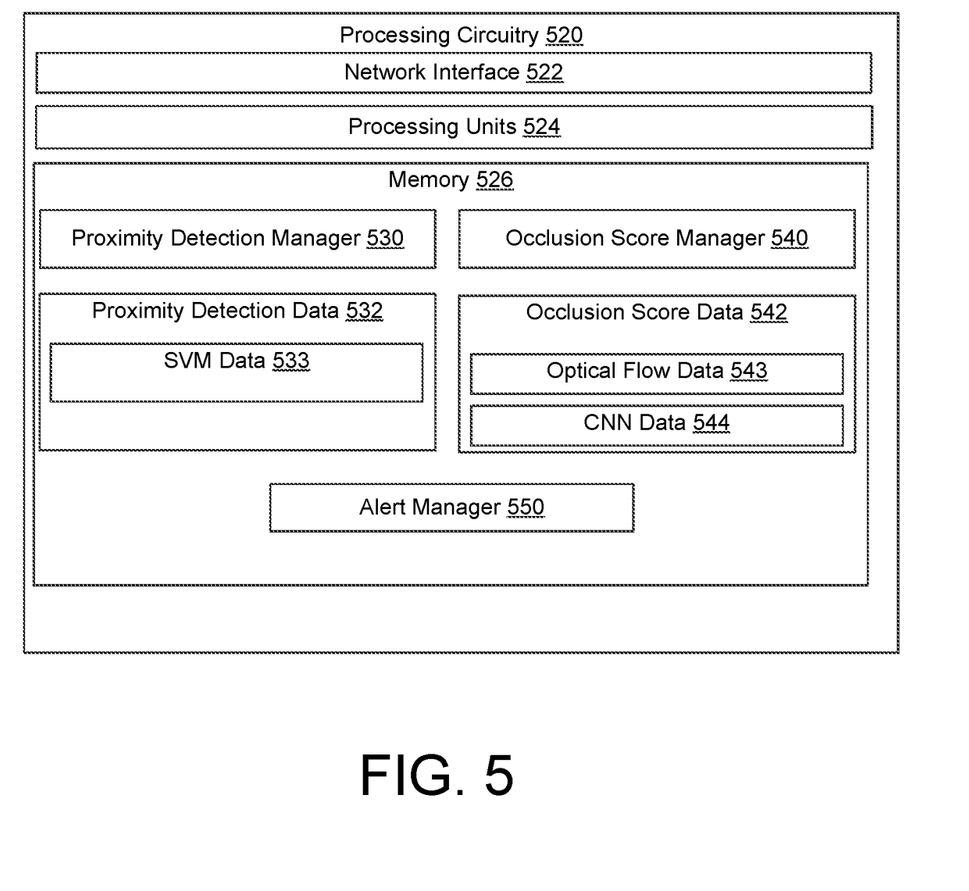
FIG. 5 is a diagram that illustrates an electronic environment for performing occlusion detection for a camera.

FIG. 5 is a diagram that illustrates an example electronic environment including processing circuitry 520 for performing closed-loop photography as described with regard to FIG. 4. The processing circuitry 520 includes a network interface 522, one or more processing units 524, and non-transitory memory (storage medium) 526.

In some implementations, one or more of the components of the processing circuitry 520 can be, or can include processors (e.g., processing units 524) configured to process instructions stored in the memory 526 as a computer program product. Examples of such instructions as depicted in FIG. 5 include proximity detection manager 530, occlusion score manager 540, and alert manager 550. Further, as illustrated in FIG. 5, the memory 526 is configured to store various data, which is described with respect to the respective services and managers that use such data.

The proximity detection manager 530 is configured to detect a user's finger in the vicinity of a shutter button and determine if the user intends to press the shutter button with the finger. The proximity detection manager 530 is configured to use a (proximity, signal amplitude) ordered pair measured by the IR proximity sensor as proximity detection data 532. In some implementations, during a standby mode the proximity detection manager 530 may represent the proximity coordinate by relatively large values when e.g., a finger is directly occluding within a distance of less than 1 cm from the shutter trigger); the received reflected amplitude may also be high as reflected signal amplitude falls off in squared fashion over distance and the object is near to the IR proximity sensor.

The proximity detection manager 530 is configured to use a simple linear SVM trained to classify the valid standby data points (i.e., high proximity, high amplitude) from other false-positive sources. To accomplish this, the linear SVM outputs a classification score as follows.

classification score=$\alpha_1$*proximity+$\alpha_2$*amplitude+$\alpha_3$.

The coefficients $\alpha_1$, $\alpha_2$, and $\alpha_3$ are stored as SVM data 533. The SVM data 533 also includes the intermediate values of the SVM that give rise to the output of the classification score.

The proximity detection manager 530 is also configured to determine whether to engage the occlusion score manager 540 if the proximity detection manager 530 determines, using the SVM output, whether the finger is about to press the shutter button.

The occlusion score manager 540 is configured to determine whether the user's finger will occlude an image of a scene as it depresses the shutter button. To this effect, the occlusion score manager 540 is configured to take few-frame shots and input the few-frame shots into an occlusion scoring model to produce an occlusion score, represented by occlusion score data 542. The decision whether to issue an alert is based on the occlusion score.

As shown in FIG. 5, the occlusion score data 542 includes optical flow data 543 and convolutional neural network (CNN) data 544. The optical flow data 543 results from the few-frame shots (e.g., about 2-4 frames taken in quick succession). For the few-frame shots, the occlusion score manager 540 computes an optical flow measure as optical flow data as a measure of the consistency of the occlusion. The occlusion score manager 540 then inputs the optical flow data 543 into a CNN, whose layer data, hyperparameters, etc. are represented by CNN data 544. The output of the CNN is the occlusion score, represented by the occlusion score data 542.

The alert manager 550 is configured to issue an alert to the user if the occlusion score is greater than a threshold. In some implementations, the alert is visual, e.g., a flashing or blinking light, a textual message on the display, etc. In some implementations, the alert includes audio, e.g., a beep or a buzzer. In some implementations, the alert includes tactile responses such as a vibration on the frame.

The components (e.g., modules, processing units 524) of processing circuitry 520 can be configured to operate based on one or more platforms (e.g., one or more similar or different platforms) that can include one or more types of hardware, software, firmware, operating systems, runtime libraries, and/or so forth. In some implementations, the components of the processing circuitry 520 can be configured to operate within a cluster of devices (e.g., a server farm). In such an implementation, the functionality and processing of the components of the processing circuitry 520 can be distributed to several devices of the cluster of devices.

The components of the processing circuitry 520 can be, or can include, any type of hardware and/or software configured to process private data from a wearable device in a split-compute architecture. In some implementations, one or more portions of the components shown in the components of the processing circuitry 520 in FIG. 5 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the processing circuitry 520 can be, or can include, a software module configured for execution by at least one processor (not shown). In some implementations, the functionality of the components can be included in different modules and/or different components than those shown in FIG. 5, including combining functionality illustrated as two components into a single component.

The network interface 522 includes, for example, wireless adaptors, and the like, for converting electronic and/or optical signals received from the network to electronic form for use by the processing circuitry 520. The set of processing units 524 include one or more processing chips and/or assemblies. The memory 526 includes both volatile memory (e.g., RAM) and non-volatile memory, such as one or more ROMs, disk drives, solid state drives, and the like. The set of processing units 524 and the memory 526 together form processing circuitry, which is configured and arranged to carry out various methods and functions as described herein.

Although not shown, in some implementations, the components of the processing circuitry 520 (or portions thereof) can be configured to operate within, for example, a data center (e.g., a cloud computing environment), a computer system, one or more server/host devices, and/or so forth. In some implementations, the components of the processing circuitry 520 (or portions thereof) can be configured to operate within a network. Thus, the components of the processing circuitry 520 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some implementations, one or more of the components of the processing circuitry 520 can be, or can include, processors configured to process instructions stored in a memory. For example, proximity detection manager 530 (and/or a portion thereof), occlusion score manager 540 (and/or a portion thereof), and alert manager 550 (and/or a portion thereof) are examples of such instructions.

In some implementations, the memory 526 can be any type of memory such as a random-access memory, a disk drive memory, flash memory, and/or so forth. In some implementations, the memory 526 can be implemented as more than one memory component (e.g., more than one RAM component or disk drive memory) associated with the components of the processing circuitry 520. In some implementations, the memory 526 can be a database memory. In some implementations, the memory 526 can be, or can include, a non-local memory. For example, the memory 526 can be, or can include, a memory shared by multiple devices (not shown). In some implementations, the memory 526 can be associated with a server device (not shown) within a network and configured to serve the components of the processing circuitry 520. As illustrated in FIG. 5, the memory 526 is configured to store various data, including proximity detection data 532 and occlusion score data 542.

Figure 6:
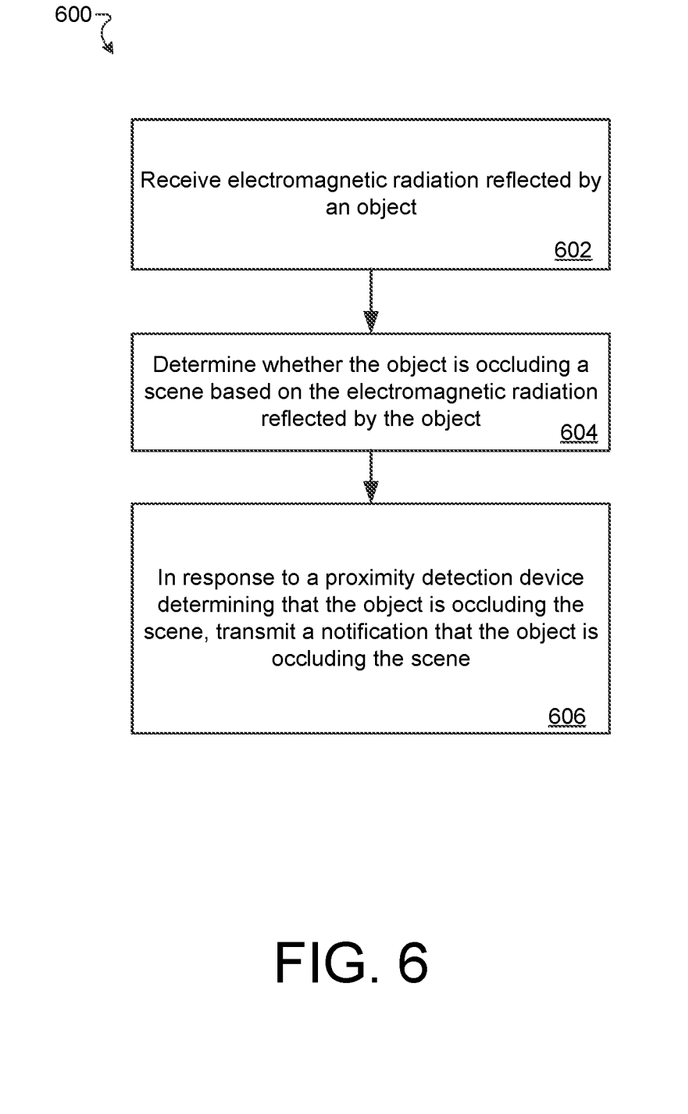
FIG. 6 is a flow chart that illustrates a method of performing occlusion detection for a camera.

FIG. 6 is a flow chart that illustrates a method 600 of performing occlusion detection for a camera. The method 600 may be performed using the processing circuitry 520 of FIG. 5.

At 602, the proximity detection manager 530 receives electromagnetic radiation (e.g., light) reflected by an object (e.g., a user's finger).

At 604, the proximity detection manager 530 and the occlusion score manager 540 determine whether the object is occluding a scene based on the electromagnetic radiation reflected by the object. That is, the proximity detection manager 530 determines, based on the received electromagnetic radiation, that the object is going to depress a shutter trigger. The occlusion score manager then determines, from images of the object, whether the finger will occlude an image of scene taken upon the depressing of the shutter trigger.

At 606, the alert manager 550, in response to a proximity detection device determining that the object is occluding the scene, transmits a notification that the object is occluding the scene.

Specific structural and functional details disclosed herein are merely representative for purposes of describing example embodiments. Example embodiments, however, may be embodied in many alternate forms and should not be construed as limited to only the embodiments set forth herein.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 70 degrees or at other orientations) and the spatially relative descriptors used herein may be interpreted accordingly.

Example embodiments of the concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the described concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example embodiments.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present embodiments.

Unless otherwise defined, the terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. An apparatus, comprising:
a camera including:
a shutter trigger configured to cause a shutter to open; and
an occlusion device configured to determine whether an object will occlude a scene while the shutter is open, the occlusion device including:
a proximity device configured to determine whether the object is moving toward the shutter trigger based on a temporal pattern of radiation reflected from the object; and
a notification device configured to, in response to the proximity device determining that the object is moving toward the shutter trigger, transmit a notification that the object is occluding the scene.

2. The apparatus as in claim 1, wherein the proximity device includes:
a source of electromagnetic radiation configured to transmit electromagnetic radiation propagating away from the camera; and
processing circuitry configured to determine whether the object is moving to cause the shutter to be opened based on the temporal pattern of the electromagnetic radiation reflected from the object.

3. The apparatus as in claim 2, wherein the processing circuitry configured to determine whether the object is moving to cause the shutter to be opened is further configured to:
perform a classification operation on the temporal pattern of electromagnetic radiation reflected toward the camera to produce a classification of whether or not the object is moving to cause the shutter to be opened, the classification operation being based on a support vector machine trained to perform the classification operation based on a proximity of the object to the camera and an amplitude of the temporal pattern of electromagnetic radiation reflected toward the camera.

4. The apparatus as in claim 3, wherein the classification of whether or not the object is moving to cause the shutter to be opened is based on whether a classification score is less than or greater than a threshold, the classification score including a linear combination of a proximity of the object to the camera and an amplitude of the temporal pattern of electromagnetic radiation propagating toward the camera, coefficients of the proximity and the amplitude being based on a device upon which the camera is disposed.

5. The apparatus as in claim 2, wherein the processing circuitry is first processing circuitry, and wherein the proximity device further includes second processing circuitry configured to:
determine, in response to the first processing circuitry determining that the object is moving to cause the shutter to be opened, a degree to which the object is occluding the scene,
wherein the notification is transmitted in response to the degree being larger than a threshold.

6. The apparatus as in claim 5, wherein the second processing circuitry is further configured to, in response to the first processing circuitry determining that the object is moving to cause the shutter to be opened:
open and close the shutter a specified number of times at a specified rate to produce a plurality of image frames; and
wherein the second processing circuitry configured to determine the degree to which the object is occluding the scene is further configured to:
input the plurality of image frames into a convolutional neural network configured to produce an occlusion strength indicating the degree to which the object is occluding the scene.

7. The apparatus as in claim 6, wherein the second processing circuitry configured to input the plurality of image frames into the convolutional neural network is further configured to:
generate an optical flow measure based on the plurality of image frames, the optical flow measure indicating a measure of consistency of occlusion between each pair of sequential frames of the plurality of image frames; and
input the optical flow measure into the convolutional neural network.

8. The apparatus as in claim 6, wherein the second processing circuitry configured to transmit notification data indicating that the scene is occluded by the object is further configured to:
transmit an audio signal having a volume based on the occlusion strength.

9. The apparatus as in claim 5, wherein the camera is disposed on a frame of a smartglasses system, and
wherein the second processing circuitry configured to transmit notification data indicating that the scene is occluded by the object is further configured to:
transmit a video signal configured to be displayed on a display of the smartglasses system.

10. The apparatus as in claim 2, wherein the source of electromagnetic radiation is disposed within the shutter trigger.

11. A method, comprising:
receiving electromagnetic radiation reflected by an object;
determining whether the object is occluding a scene based on a temporal pattern of the electromagnetic radiation reflected by the object; and
in response to determining that the object is occluding the scene, transmitting a notification that the object is occluding the scene.

12. The method as in claim 11, wherein determining whether the object is occluding the scene includes:
transmitting electromagnetic radiation propagating away from a camera including a shutter trigger configured to cause a shutter to open; and
determining whether the object is moving to cause the shutter to be opened based on the temporal pattern of the electromagnetic radiation reflected from the object.

13. The method as in claim 12, wherein determining whether the object is moving to cause the shutter to be opened includes:
performing a classification operation on the temporal pattern of electromagnetic radiation reflected toward the camera to produce a classification of whether or not the object is moving to cause the shutter to be opened, the classification operation being based on a support vector machine trained to perform the classification operation based on a proximity of the object to the camera and an amplitude of the temporal pattern of electromagnetic radiation reflected toward the camera.

14. The method as in claim 13, wherein the classification of whether or not the object is moving to cause the shutter to be opened is based on whether a classification score is less than or greater than a threshold, the classification score including a linear combination of a proximity of the object to the camera and an amplitude of the temporal pattern of electromagnetic radiation propagating toward the camera, coefficients of the proximity and the amplitude being based on a device upon which the camera is disposed.

15. The method as in claim 12, further comprising:
determining, in response to determining that the object is moving to cause the shutter to be opened, a degree to which the object is occluding the scene,
wherein the notification is transmitted in response to the degree being larger than a threshold.

16. The method as in claim 15, further comprising, in response to determining that the object is moving to cause the shutter to be opened:
opening and closing the shutter a specified number of times at a specified rate to produce a plurality of image frames; and
wherein determining the degree to which the object is occluding the scene includes:
inputting the plurality of image frames into a convolutional neural network configured to produce an occlusion strength indicating the degree to which the object is occluding the scene.

17. The method as in claim 16, wherein inputting the plurality of image frames into the convolutional neural network includes:
generating an optical flow measure based on the plurality of image frames, the optical flow measure indicating a measure of consistency of occlusion between each pair of sequential frames of the plurality of image frames; and
inputting the optical flow measure into the convolutional neural network.

18. The method as in claim 16, wherein
the notification includes an audio signal having a volume based on the occlusion strength.

19. The method as in claim 15, wherein the camera is disposed on a frame of a smartglasses system, and wherein
the notification includes a video signal configured to be displayed on a display of the smartglasses system.

20. A computer program product comprising a non-transitory storage medium, the computer program product including code that, when executed by processing circuitry, causes the processing circuitry to perform a method, the method comprising:
receiving electromagnetic radiation reflected by an object;
determining whether the object is occluding a scene based on a temporal pattern of the electromagnetic radiation reflected by the object; and
in response to determining that the object is occluding the scene, transmitting a notification that the object is occluding the scene.

21. The computer program product as in claim 20, wherein determining whether the object is occluding the scene includes:
transmitting electromagnetic radiation propagating away from a camera including a shutter trigger configured to cause a shutter to open; and
determining whether the object is moving to cause the shutter to be opened based on the temporal pattern of the electromagnetic radiation reflected from the object.

22. The computer program product as in claim 21, wherein determining whether the object is moving to cause the shutter to be opened includes:
performing a classification operation on the temporal pattern of electromagnetic radiation reflected toward the camera to produce a classification of whether or not the object is moving to cause the shutter to be opened, the classification operation being based on a support vector machine trained to perform the classification operation based on a proximity of the object to the camera and an amplitude of the temporal pattern of electromagnetic radiation reflected toward the camera.

23. The computer program product as in claim 21, wherein the method further comprises:
determining, in response to determining that the object is moving to cause the shutter to be opened, a degree to which the object is occluding the scene,
wherein the notification is transmitted in response to the degree being larger than a threshold.

* * * * *